(12) United States Patent
Yoshikai et al.

(10) Patent No.: US 7,396,583 B2
(45) Date of Patent: Jul. 8, 2008

(54) LAMINATE AND DISPLAY FILTER USING THE SAME

(75) Inventors: Masaaki Yoshikai, Sodegaura (JP); Satoru Okada, Tokyo (JP); Hirokazu Mizuma, Sodegaura (JP); Yukinori Asakawa, Sodegaura (JP); Tomoaki Ito, Sodegaura (JP); Masanari Ota, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 285 days.

(21) Appl. No.: 10/892,145

(22) Filed: Jul. 16, 2004

(65) Prior Publication Data

US 2005/0068648 A1 Mar. 31, 2005

(30) Foreign Application Priority Data

Jul. 18, 2003 (JP) ............................. 2003-276559

(51) Int. Cl.
*B32B 5/16* (2006.01)
*B32B 15/08* (2006.01)

(52) U.S. Cl. ...................................... 428/323; 428/328

(58) Field of Classification Search ........................ None
See application file for complete search history.

(56) References Cited

U.S. PATENT DOCUMENTS

| | | | |
|---|---|---|---|
| 4,547,400 A | 10/1985 | Middleton et al. | |
| 4,707,405 A | 11/1987 | Evans et al. | |
| 5,279,722 A | 1/1994 | Zmelty et al. | |
| 6,104,530 A * | 8/2000 | Okamura et al. | ............ 359/359 |
| 6,480,250 B1 * | 11/2002 | Matsufuji et al. | ........... 349/113 |
| 6,597,525 B2 * | 7/2003 | Kubota | ....................... 359/885 |
| 2003/0156080 A1 | 8/2003 | Koike et al. | |

FOREIGN PATENT DOCUMENTS

| | | |
|---|---|---|
| CN | 2203342 Y | 7/1995 |
| CN | 1397057 A | 2/2003 |
| DE | 3241516 A1 | 5/1984 |
| EP | 0 727 306 A2 | 8/1996 |
| JP | 2535641 B2 * | 9/1996 |
| JP | 11-035855 A | 2/1999 |
| JP | 2002-189421 A | 7/2002 |
| WO | 02/13224 A2 | 2/2002 |
| WO | 03/102686 A1 | 12/2003 |

OTHER PUBLICATIONS

English Abstract of JP 59-44993 published Nov. 2, 1984.
English Abstract of JP 09-331488 published Dec. 22, 1997.

* cited by examiner

*Primary Examiner*—Monique R Jackson
(74) *Attorney, Agent, or Firm*—Buchanan Ingersoll & Rooney PC

(57) ABSTRACT

A transparent and conductive laminate that is substantially decreased in reactive defects, and a display filter, a heat-ray reflecting film and an electromagnetic wave-shielding film comprising the laminate are provided. The laminate includes a transparent substrate, a transparent conductive thin-film layer containing silver, and a protective layer containing a binder material and inorganic fine particles, wherein the transparent conductive thin-film layer is in contact with the protective layer. The generation of reflective defects can be outstandingly reduced. Therefore, a laminate superior in electromagnetic wave-shielding ability, heat-ray reflecting ability and visibility for a long period of time and products comprising the laminate can be obtained.

14 Claims, 4 Drawing Sheets

LAMINATE AND DISPLAY FILTER USING THE SAME

BACKGROUND OF THE INVENTION

1. Field of the Invention

The present invention relates to a laminate and also relates to a display filter, and particularly, to a transparent conductive laminate having high quality and durability and to a display filter.

2. Description of the Related Art

With the progress of a multimedia society and a digital society, image information and digital information transmitted, allotted or processed are increasing outstandingly. The importance of display devices that are monitors displaying the information is more increased as interfaces or key devices connecting human beings with communication devices, imaging devices and computers.

As such a display device, various thin type displays are studied energetically in place of conventional cathode ray tube (CRT) monitors which are heavy and thick and have a difficulty in developing a large-sized display device. Much attention is focused on plasma display panels (PDP), field emission displays (FED) and the like among these thin type displays which make it relatively easy to realize thin type and large-sized displays.

Particularly, PDPs have reached a mass-production stage and each maker comes out with a plan for increasing the output of PDPs so as to double the output every year. On the other hand, there are makers announcing that they are newly entering the field of PDPs and it is therefore expected in newspapers and the like that the market of these PDPs will be rapidly expanded.

These PDPs have the advantages in developing thin and large-scaled products. However, they have the problem that because they utilize a discharge phenomenon, they generate an intensive electromagnetic wave leakage in principle. For this, it becomes necessary to suppress the electromagnetic wave leakage generated from a plasma display within a safe standard value (for example, VCCI (Voluntary Control Council for Interference by data processing equipment electronic office machine) in Japan and FCC (Federal Communication Commission) in USA.

Also, the PDP emits intense near-infrared rays. Because wireless LANs, cordless phones, infrared remote controllers and the like are devices utilizing near-infrared rays, it is pointed out that there are the possibilities of the PDP causing the malfunction of these devices. From the above fact, the PDP must be provided with a means for decreasing a electromagnetic wave leakage to the above defined range to shield light in a wavelength range from 800 to 1000 nm which is the near-infrared range to a level where the malfunction is not substantially caused.

The electromagnetic wave and near-infrared rays as mentioned above can be restrained from being emitted by coating the whole PDP with a conductive material such as a metal. However, it is necessary to use a material having not only conductivity but also transparency on an image display part. For this, a filter having transparency and conductivity is preferably used on the display part of the PDP. Preferable examples of such a display filter include transparent conductive thin-film type optical filters prepared by arranging a transparent conductive thin-film on the entire surface of a substrate such as a glass substrate. As the transparent conductive thin-film type optical filter, those having a laminate structure constituted of a transparent conductive thin-film that cuts electromagnetic waves and a film having an anti-reflecting function and a glare-proof function are known.

It is needless to say that the electromagnetic wave-shielding ability of a display filter is higher with a decrease in the surface resistance thereof. Therefore, silver that has the lowest specific resistance among pure materials or a metal thin film constituted primarily of silver is preferably used as the foregoing transparent conductive thin film. Actually, it is usual to make a laminate, prepared by sandwiching a metal thin-film layer mainly containing silver between transparent high-refractive index thin-film layers, as the transparent conductive thin film for the purpose of raising transmittance and improving the stability of the metal thin-film layer.

However, as is well known, there is a large problem that silver which is preferably used as the metal thin-film layer material generates an aggregate of atoms very easily. When silver atoms of the silver thin-film layer aggregate, not only are the low-resistance characteristics required for a metal thin film impaired but also silver white spots (also called spot defects, reflection defects or white spots) are produced. When many reflection defects are produced in a display filter, these reflection defects appear as white spots on a number of forceful images projected on a plasma display to which the filter is set, producing the harmful effect of deteriorating image quality. As mentioned above, the reflection defects give rise to a large problem that the characteristics such as high transparency and low-resistance characteristics which the metal thin-film material has are lost and these defects also deteriorate product quality as a filter.

It is conventionally known that the aggregation of silver atoms in the silver thin-film layer occurs easily in the presence of a chlorine ion and foreign substances (particles). Along with the development of a large-sized screen which is desired in the market, the number of particles intermingled per filter is expected to be increased. In this situation, the number of white spots generated in each filter increases and it is expected that the yield of the filter is decreased. Therefore, in optical filters for PDPs which are more increased in size, techniques for preventing the occurrence of white spots on the silver thin-film layer more efficiently are considered to be more desired in the future.

Attempts to remove foreign substances and chlorine like the above are reported in each publication of JP-B No. 59-44993 and JP-A No. 9-331488. However, in order to produce a filter for large-sized displays at a high yield, it is required to suppress the aggregation of silver atoms at a high level.

On the other hand, attempts have been made to prevent the chlorine ion and the like from reaching the silver thin-film layer by making thick the transparent high-refractive index thin-film layer. However, it is demanded of an optical filter to have high transparency as mentioned above. There is therefore a limitation to the thickness of the transparent high-refractive index thin-film layer and there is a limitation in applying the above method.

As other attempts, there is a method in which a metal thin film such as copper or platinum which has corrosion resistance is laminated on the silver thin-film layer. However, this method has the problem that it is accompanied by a reduction in transparency and a rise in surface resistance.

To mention the present state of art, no display filter having a structure which can easily prevent the occurrence of reflection defects has been obtained so far as mentioned above.

In the meantime, radio devices and electronic devices have been recently developed outstandingly and a demand for these devices has been increased. Radio devices are convenient but, on the contrary, has such a danger that electromagnetic waves in use are monitored by others and the information which these electromagnetic waves have is read. Not only in these radio devices but also in electronic device, electromagnetic waves are generated from cords beside the body and monitored by others and the information of these electromagnetic waves is read easily in the same manner as in the case of radio devices. There has been an increased demand for electromagnetic wave-shielding materials in recent years to suppress the leakage of information associated with the leakage of electromagnetic waves. Although electromagnetic waves can be cut by conductive materials such as a metal, there is a demand for materials, such as those used for windows of various buildings, car windows and display parts of various display devices, for which transparency in addition to electromagnetic wave-shielding ability is required. Also, it is demanded of materials used in applications such as windows to have heat-ray reflecting ability for the purpose of saving energy by increasing cooling efficiency in buildings in a summer season.

In order to attain these electromagnetic wave-shielding ability and heat-ray reflecting ability, the above thin film containing silver as its major component has preferable natures. However, in these applications like the case of the above display, there are problems such as a decline in product quality caused by the generation of white spots, a reduction in yield and a reduction in life and it is therefore desired to suppress the aggregation of silver atoms at a high level.

EXPLANATIONS OF THE SYMBOLS

Figure 1:
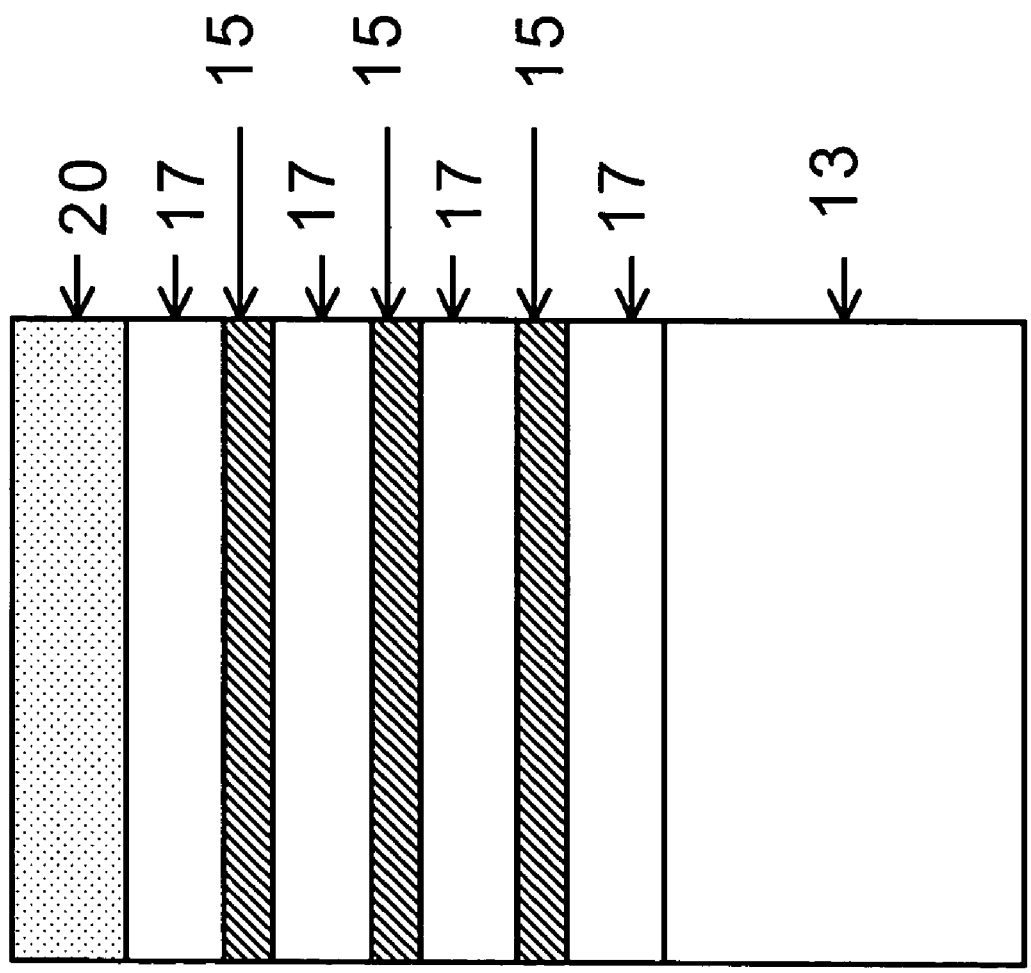
FIG. 1 is a view showing one example of the layer structure of a transparent conductive thin-film laminate film in the present invention.

10 Transparent electromagnetic wave-shielding film
13 Transparent polymer film substrate
15 Transparent conductive metal thin film layer containing silver
17 Transparent high-refractive index thin-film layer
18 Multilayer transparent conductive thin-film layer
20 Protective layer
30 Film having anti-reflecting ability (anti-reflecting film)
30' Film having glare-proof ability (glare-proof film)
33 Transparent support substrate
40 Hardcoat layer
50 Electrode
60 Hardcoat layer
70 Sticky material layer containing a ultraviolet absorber
80 Glass substrate for window use

SUMMARY OF THE INVENTION

It is an object of the present invention to provide a (transparent and conductive) laminate which is very decreased in the occurrence of reflective defects like the above, and a display filter, an electromagnetic wave-shielding film, a heat-ray reflecting film and a window material using the laminate.

The inventors of the present invention have made earnest studies from this point of view, and as a result, found surprisingly that a laminate comprising a protective layer containing inorganic fine particles and a binder material and a transparent conductive thin-film layer attains the object of the invention, to complete the present invention.

According to the present invention, the following inventions are provided.

The present invention relates to a laminate comprising:
a transparent substrate (A);
a transparent conductive thin-film layer (B) containing silver; and
a protective layer (C) containing a binder material (C1) and inorganic fine particles (C2), wherein the transparent conductive thin-film layer (B) is in contact with the protective layer (C).

In the laminate of the present invention, the inorganic fine particles (C2) comprise preferably metal oxides.

In the laminate of the present invention, the inorganic fine particles (C2) comprise preferably complex oxides containing antimony oxide or a mixture of oxides containing antimony oxide.

In the laminate of the present invention, the binder material (C1) comprises preferably one or more resins selected from a silicone resin, a polyester resin and a urethane resin.

In the laminate of the present invention, the transparent conductive thin-film layer (B) contains preferably:
a transparent high-refractive index thin-film layer (B1); and
a transparent metal thin-film layer (B2) containing silver or an alloy containing silver.

According to the present invention, a laminate can be obtained which has excellent characteristics that it has high conductivity, high transparency and high near-infrared reflectance and preferably high infrared reflectance and is very decreased in the occurrence of white spots.

Also, the present invention relates to a display filter comprising:
the above laminate; and
a functional transparent layer (D).

The display filter of the present invention preferably has the characteristics that the frequency of the occurrence of spot defects 0.1 mm or more in diameter is 2 defects/m$^2$ or less after the filter is exposed to an atmosphere of 60° C. and 90% RH for 24 hours.

Also, the present invention relates to a display device using the above display filter.

According to the present invention, a display filter and a display device which can provide a beautiful picture can be provided because the occurrence of white spots is decreased.

Also, the present invention relates to an electromagnetic wave-shielding film using the above laminate. According to the present invention, an electromagnetic wave-shielding film which is reduced in the occurrence of white spots and has excellent visibility for a long period of time can be obtained.

Also, the present invention relates to a heat-ray reflecting film using the above laminate. According to the present invention, a heat-ray reflecting film which is reduced in the occurrence of white spots and has excellent visibility for a long period of time can be obtained.

Also, the present invention relates to an electromagnetic wave-shielding film capable of being applied to a window, wherein the film comprises:
the above laminate; and
a functional transparent layer (D).

Also, the present invention relates to a heat-ray reflecting film capable of being applied to a window, wherein the film comprises:

the above laminate; and a functional transparent layer (D).

Also, the present invention relates to a window having a laminate structure comprising the above electromagnetic wave-shielding film capable of being applied to a window and a substrate for transparent-window use.

Also, the present invention relates to a window having a laminate structure comprising the above heat-ray reflecting film capable of being applied to a window and a substrate for transparent-window use.

According to the present invention, a window which is reduced in the occurrence of white spots, has excellent visibility for a long period of time and is producible by a simple method can be provided.

Also, the present invention relates to a semiconductor device comprising the above laminate. According to the present invention, for example, a semiconductor device which is not affected by an disorder caused by an electromagnetic wave and a semiconductor device which can be used at high temperatures can be provided.

PREFERRED EMBODIMENTS OF THE INVENTION

The present invention will be explained in detail. In the present invention, the sticky material occasionally implies an adhesive.

The laminate of the present invention comprises:

a transparent substrate (A);

a transparent conductive thin-film layer (B) containing silver; and a protective layer (C), wherein the transparent conductive thin-film layer (B) is in contact with the protective layer (C). Also, the protective layer (C) contains a binder material (C1) and inorganic fine particles (C2).

The display filter of the present invention has a structure containing the above laminate and a functional transparent layer (D). Examples of the functional transparent layer (D) include an anti-reflecting layer, a glare-proof layer, a hardcoat layer, a ultraviolet absorbing layer, a contamination preventive layer and an antistatic layer. Also, the display filter may contain a sticky material layer (E) according to the need.

The electromagnetic wave-shielding film and heat-ray reflecting film of the present invention respectively comprise the laminate of the present invention. For example, the laminate of the present invention may be used as the electromagnetic wave-shielding film or as the heat-ray reflecting film as it is. Also, the laminate of the present invention may be combined with, for example, the above functional transparent layer (D) to make the electromagnetic wave-shielding film or the heat-ray reflecting film. Examples of the use of the above film obtained by combining the laminate with the functional transparent layer (D) include an electromagnetic wave-shielding film capable of being applied to a window and a heat-ray reflecting film for window use. As the functional transparent layer (D) to be used in the above film capable of being applied to a window, specifically, an ultraviolet absorbing layer, a hardcoat layer and the like are preferably used.

The window of the present invention has the characteristics that it has a laminate structure constituted of the above film capable of being applied to a window and substrate for transparent window use.

Each of these structural elements will be explained below.

(Transparent Substrate (A))

As the above transparent substrate (A), a plastic plate or a glass plate may be preferably used. As the plastic plate, specifically, an acrylic resin including a polymethylmethacrylate (PMMA), polycarbonate resin, transparent acrylonitrile-butadiene-styrene resin(ABS) or the like may be used. However, the transparent substrate is not limited to these resins. The thickness of the plastic plate is generally about 1 mm to 10 mm though there is no particular limitation to it. When the glass plate is used, it is preferable to use semi-reinforced glass plate or reinforced glass plate obtained by carrying out chemically reinforcing processing or thermal tempering reinforcing processing. The thickness of the glass plate is preferably about 1 to 4 mm taking its weight into account. Also, a part of the glass plate or plastic plate, which part is to be the peripheral part of the display filter may be provided with a color (for example, black) architrave printing with the intention of, for example, improving the decoration of the part.

Also, the polymer film which is preferably used when producing the transparent conductive thin-film layer (B) which will be explained later may be used as the transparent substrate (A). A soft transparent sheet having an impact resistance may also be used as the transparent substrate (A). The optical filter obtained using these materials may be used by applying it directly to a PDP module.

The aforementioned plastic plate, glass plate, polymer film, soft transparent sheet and the like may be used in combinations of two or more. In this case, these materials may be directly laminated on each other to combine these materials or may be used by applying them by using the sticky material layer (E) which will be explained later.

(Transparent Conductive Thin-film Layer (B) Containing Silver)

The transparent conductive thin-film layer (B) containing silver in the present invention may use known structure without any limitation. Besides a structure in which the layer (B) is formed directly on the transparent substrate (A), for example, a structure in which the layer (B) is formed on a polymer film or on a film having an anti-reflecting or glare-proof function as will be described later may be used without any limitation. Among these structures, a method in which a transparent conductive thin-film laminate film provided with a silver-containing transparent conductive thin-film formed on a polymer film is used as the transparent conductive thin-film layer (B) is particularly preferable from the viewpoint of, for example, production efficiency and quality control. FIG. 1 shows one example of the layer structure of the laminate in the present invention. In the layer structure, a silver-containing transparent conductive metal thin film 15 and a transparent high-refractive index thin film 17 are alternately laminated on a transparent polymer film substrate 13 such that the film 15 is sandwiched between the films 17 and further a protective layer 20 which will be explained later is laminated.

As the polymer film, a flexible and highly transparent polymer film about 10 to 300 μm in thickness is preferably used. Examples of the polymer film include a polyethylene terephthalate (PET), polyimide (PI), polysulfone (PS), polyethersulfone (PES), polymethylenemethacrylate (PMMA), polycarbonate (PC), polyether ether ketone (PEEK), polypropylene (PP) and triacetyl cellulose (TAC). Among these compounds, a polyethylene terephthalate (PET) and triacetyl cellulose (TAC) are particularly preferably used.

As the transparent conductive thin-film layer (B) used in the present invention, a laminate containing a transparent high-refractive index thin-film layer (B1) and a transparent metal thin-film layer (B2) made of silver or an alloy containing silver is preferably adopted. Silver has a specific resistance of $1.59 \times 10^{-6}$ ($\Omega \cdot cm$) and is most superior in electroconductivity to all materials, and also superior in visible light transmittance when it is used as a thin film. Silver is therefore most preferably used. On the other hand silver has the problem that when it is made into a thin film, it lacks stability so that it is easily sulfidized and chlorinated. Therefore, in order to improve the stability of silver, an alloy containing silver, specifically, a silver alloy mainly containing silver, alloy of silver and gold, alloy of silver and copper, alloy of silver and palladium, alloy of silver, copper and palladium, alloy of silver and platinum or the like may also be used.

The thickness of the transparent metal thin-film layer (B2) is generally about 0.5 to 100 nm per layer though it is determined in consideration of the transmittance and electroconductivity of the whole multilayer transparent conductive thin-film layer.

When the metal thin-film layer is formed on the outermost surface, the elemental composition of silver which is a main metal on the outermost layer is preferably 3 to 99% (atomic proportion).

Known materials may be used for the transparent high-refractive index thin-film layer (B1) without any limitation. As the material for the transparent high-refractive index thin-film layer (B1), a material having high transparency, for example, a material having such transparency that when a thin film having a film thickness of about 100 nm is formed, the transmittance of the thin film for light having a wavelength of 400 to 700 nm is 60% or more is preferable. A high-refractive index material having a refractive index of 1.4 or more for 550 nm light is also preferable. Examples of materials preferably used as the transparent high-refractive index thin-film layer (B1) include an oxide of indium and tin (ITO), zinc oxide (ZnO), titanium oxide ($TiO_2$), oxide of cadmium and tin (CTO), aluminum oxide ($Al_2O_3$), oxide of zinc and aluminum (AZO), magnesium oxide (MgO), thorium oxide ($ThO_2$), tin oxide ($SnO_2$), lanthanum oxide ($LaO_2$), silicon oxide ($SiO_2$), indium oxide ($In_2O_3$), niobium oxide ($Nb_2O_3$), antimony oxide ($Sb_2O_3$), zirconium oxide ($ZrO_2$), cesium oxide ($CeO_2$) and bismuth oxide ($BiO_2$). A transparent high-refractive-index sulfide may be used. Specific examples of the sulfide include zinc sulfide (ZnS), cadmium sulfide (CdS) and antimony sulfide ($Sb_2S_3$).

Among the above compounds, ITO, ZnO and $TiO_2$ are particularly preferable as the material for the transparent high-refractive index thin-film layer (B1). This is because ITO and ZnO have electroconductivity, have a refractive index as high as about 2.0 in the visible region and also has no absorption in the visible region, and $TiO_2$ is an insulating material and has a refractive index as high as about 2.3 for visible rays though it has slight absorption in the visible region.

The multilayer laminate of the transparent metal thin-film layer (B2) and the transparent high-refractive index thin-film layer (B1) may be formed by a conventionally known method such as a sputtering method, ion plating method and vacuum deposition method. Among these methods, a sputtering method is preferable because it is preferably used to form a multilayer laminate having a controlled film thickness and enables the formation of a laminate of a metal thin-film layer and a high-refractive index thin-film layer, and specifically, can form a metal thin-film layer made of silver or an alloy containing silver and a transparent high-refractive index thin-film layer constituted mainly of indium oxide with ease repeatedly and continuously.

Specifically, in the formation of the transparent metal thin-film layer (B2), a d.c. (DC) or frequency (RF) magnetron sputtering method is preferably used which is carried out using silver or an alloy containing silver as a target and inert gas such as argon as a sputtering gas under a pressure of 0.01 to 3.0 Pa.

Also, in the formation of the transparent high-refractive index thin-film layer (B1), a reactive sputtering method according to a d.c. (DC) or frequency (RF) magnetron sputtering method is applied which is carried out using a metal target containing indium as its major component or a sintered body target containing indium oxide as its major component and inert gas such as argon as a sputtering gas and oxygen as a reactive gas under a pressure of 0.01 to 3.0 Pa.

As to more detailed other contents, the contents described in each publication of JP-A Nos. 10-217380 and 2002-323861 may be adopted.

(Protective Layer (C))

The protective layer (C) in the present invention is a layer constituted of a binder material (C1) and inorganic fine particles (C2).

Among these layers, a layer obtained by applying/drying a coating solution prepared by dispersing the inorganic fine particles (C2) in a solution containing the binder (C1) and a liquid such as water or an organic solvent is particularly preferable as the protective layer (C). Also, the aforementioned coating solution may be an emulsion prepared by dispersing the binder agent (C1) and the inorganic fine particles (C2) in a liquid. A solution form in which the inorganic fine particles (C2) are dispersed in a solution put in the state of an emulsion containing the binder agent (C1) and a liquid may be preferably used.

The former coating solution prepared by dispersing the inorganic fine particles (C2) in a solution of the binder material (C1) will be hereinafter explained in detail.

As the solution containing the binder material (C1) and a liquid, a colorless one which has high transparency and in which the inorganic fine particles are highly dispersible is preferably used.

The binder material (C1) of the present invention is preferably a resin. Specific examples of the resin include an acryl type rein, silicone type resin, polyester type resin, urethane type resin and fluorine type resin. Among these resins, one or more resins selected from a silicone type resin, polyester type resin and urethane type resin are preferable from the viewpoint of availability and the dispersibility of the inorganic fine particles (C2) in the binder material (C1) which will be explained later. As such a resin, a sticky or adhesive material may be used to thereby impart the function of the sticky material layer (E), which will be explained later, to the protective layer (C). Also, the aforementioned resins may also be used in combinations of two or more.

The protective layer (C) of the present invention may be applied to other layers by using the sticky agent (E) which will be explained later in general. For this, when the protective layer (C) is laminated on, for example, the functional transparent layer (D) which will be explained later, a laminating method (applying method) using conventional sticky materials may be used without any limitation.

As the solvent, a known liquid such as water, an alcohol, acetone and toluene may be used.

In the present invention, the inorganic fine particles (C2) are preferably disposed in a manner as to cover the silver containing transparent conductive thin-film layer as entirely as possible. For this, it is preferable to keep the condition under which the inorganic fine particles (C2) is highly dispersible in the binder material (C1) solution and the inorganic fine particles are scarcely precipitated. This condition is achieved by selecting the resin and the liquid appropriately according to the type of inorganic fine particles. For example, in the case of inorganic fine particles which are easily precipitated, it is preferable to select a resin having a high specific gravity or such a resin and liquid that relatively raise the viscosity of the solution.

The inorganic fine particles (C2) according to the present invention is preferably contained as the protective layer (C) in the transparent conductive thin-film layer in a manner that it is filled densely and closely in the transparent conductive thin-film layer as described above. Also, the inorganic fine particles (C2) according to the present invention are more preferably those having low permeability to chlorine, chloride, sulfur or a sulfide on the basis of an estimated mechanism of prevention of white points which mechanism will be explained later. Also, the inorganic fine particles (C2) are still more preferably those having the ability to absorb chlorine, a chloride, sulfur or a sulfide. Preferable examples of the inorganic fine particles (C2) may include fine particles of metal oxides. This reason is that because these metal oxides tend to absorb a chloride since they have a tendency to react with hydrogen chloride and the like. More specific examples of the metal oxide may include same metal oxides, such as silica, tin oxide, zinc oxide, indium oxide, antimony oxide, aluminum oxide and zirconium oxide which are the same materials as those exemplified as the preferable materials for forming the transparent high-refractive index thin-film layer (B1). These materials may be used in combinations of two or more. These metals oxides may be used, for example, as complex oxides or as mixtures of oxides. Also, the aforementioned metal oxides may be used in combination with metals. Examples of the complex oxide include indium oxide-tin.

Among these complex oxides, fine particles made of complex oxides containing antimony oxide or mixtures of complex oxides containing antimony oxide are preferable and antimony oxide-tin oxide complex oxides and antimony oxide-zinc oxide complex oxides are particularly preferable.

These metal oxides usually have a lower light transmittance than a thin-film layer of a metal oxide which is one example of the aforementioned high refractive-index transparent thin-film layer (B1). However, transparency equal to a level where there is no practical problem can be accomplished by decreasing the particle diameter. Also, when the particle diameter of the inorganic fine particles (C2) is too large, the dispersibility of the particles in the binder material (C1) is impaired. Also, when the particle diameter of the inorganic fine particles (C2) is too large, there is the case where the transparent conductive thin-film layer cannot be covered densely.

On the other hand, when the particle diameter is too small, there is the possibility that it is difficult to handle as particles.

For this, the average particle diameter of the inorganic fine particles (C2) is preferably 1 to 1000 nm, more preferably 5 to 500 nm and still more preferably 5 to 200 nm. Moreover, because it is preferable to cover the entire surface of the transparent conductive thin-film layer (B) with the inorganic fine particles (C2) as will be explained later, the grain distribution of the inorganic fine particles (C2) is preferably narrow.

The inorganic fine particles (C2) of the present invention, when used in combination with the binder material (C1), can realize transparency as mentioned above and also has the useful characteristics that it is surprisingly very superior in white spot-preventive effect as described later.

In the above coating solution, it is preferable that the solution containing the binder material (C1) and the liquid be substantially evenly mixed with the inorganic fine particles (C2). In order to obtain such a coating solution, it is preferable to mix a solution put in the condition that a solvent and the inorganic fine particles (C2) are evenly dispersed with a solution containing the binder material (C1) and a solvent.

It is also possible to add a stabilizer improving the dispersibility of the inorganic fine particles, a leveling agent improving coating characteristics to the above coating solution.

Known coating methods may be used without any limitation as a method of forming the protective layer (C) by using the coating solution obtained in this manner. Examples of the coating method include a bar coating method, reverse coating method, gravure coating method and roll coating method. There is no particular limitation to the type, viscosity and coating amount of the coating solution and conditions preferable for the above each coating method may be appropriately selected.

The thickness of the protective layer (C) is 100 μm or less and preferably 80 μm or less taking it into account to make the protective layer have the function of a sticky material layer. The thickness is usually 2 μm or less which is enough to meet the requirements, more preferably 1 μm or less and particularly preferable 0.05 μm or more and 0.5 μm or less.

Also, the luminous transmittance ($T_{vis}$) of the protective layer obtained in this manner is preferably 50% or more, more preferably 70% or more and particularly preferably 80% or more.

In the present invention, the inorganic fine particles (C2) are preferably disposed in a manner as to cover the transparent conductive thin-film layer as entirely as possible as will be explained later.

Therefore, in the composition of the binder material (C1) and the inorganic fine particles (C2) in the protective layer according to the present invention, it is preferable that the amount of the inorganic fine particles (C2) be larger than that of the binder resin (C1). However, if the content of the inorganic fine particles (C2) is too large, the inorganic fine particles (C2) can be fixed only insufficiently, causing the protective layer to be peeled and cracks to be generated, and there is therefore the case where only insufficient protective effects are obtained.

The optimum ratio of the binder material (C1) to the inorganic fine particles (C2) is largely dependent on the dispersibility of the inorganic fine particles (C2) in the binder material (C1). It is therefore preferable to find a proper ratio corresponding to the type of the binder material (C1) to be used and the type of the inorganic fine particles (C2) to be used. Generally, the ratio (inorganic fine particles (C2)/binder material (C1)) by weight of the inorganic fine particles (C2) to the binder material (C1) is preferably 0.01 to 100, more preferably 0.03 to 30 and particularly preferably 0.05 to 20.

(Functional Transparent Layer (D))

Preferable examples of the functional transparent layer (D) may include an anti-reflecting layer and a glare-proof layer. Further, known layers such as a hardcoat layer, a contamination preventive layer, a ultraviolet absorbing layer, an antistatic layer and a tonning layer may be adopted. These layers may be formed in the polymer film used to form the transparent conductive thin-film layer (B), the transparent substrate (A) or the protective layer (C). Films, such as an anti-reflecting film and glare-proof film, having the above functions or a sticky material layer may be used. To state in more detail, those described in each publication of JP-A Nos. 10-217380 and 2002-323861 may be adopted as these functional transparent layers.

As the ultraviolet absorbing layer and hardcoat layer which are the functional transparent layers (D) used preferably as the electromagnetic wave-shielding film capable of being applied to a window and as the heat-ray reflecting film, any known material may be used without any limitation insofar as it has transparency and the ability which stands against the construction works of the window as will be explained later. Specifically, preferable examples of materials used for the hardcoat layer include acryl type materials superior in transparency, cost and workability. As a method of forming the hardcoat layer, any of known methods may be used without any limitation. Examples of the method of forming the hardcoat layer include a bar coating method, reverse coating method, gravure coating method and roll coating method. There is also no limitation to the type, viscosity and coating amount of the coating solution and conditions desirable for the above each coating method may be appropriately selected. Also, the pencil hardness (Japanese Industrial Standard (JIS) K5400) of the obtained hardcoat layer is preferably H or more and particularly preferably 2H or more.

As the ultraviolet absorbing layer, any of known materials may be used without any limitation insofar as it is transparent. Also, no particular limitation is imposed on a method of forming the ultraviolet absorbing layer. As to specific examples of the ultraviolet absorbing layer, the ultraviolet absorbing layer may be used in the form of a ultraviolet absorbing film obtained by imparting a ultraviolet absorbing function to a polymer film, in the form of the transparent substrate (A), protective layer (C) or hardcoat layer provided with a ultraviolet absorbing function or in the form of the sticky agent layer (E).

(Sticky Material Layer (E))

In the present invention, the transparent substrate (A), the transparent conductive thin-film layer (B), the protective layer (C) and the functional transparent layer (D) are applied through the sticky material layer (E). Specific examples of the combination of layers between which the sticky material layer is applied include spaces between the transparent substrate (A)—the polymer film formed with the transparent conductive thin-film layer (B), between the transparent substrate (A)—the protective layer (C), between the transparent substrate (A)—the functional transparent layer (D), between the protective layer (C)—the functional transparent layer (D) and between the polymer film formed with the transparent conductive thin-film layer (B)—the functional transparent layer (D).

It is to be noted that the term "sticky agent" so-described in the present invention is used with carrying an implication of an adhesive.

As the sticky material layer (E), any known material may be used without any limitation insofar as it is transparent. It is also possible to make the sticky material layer (E) have a function as the tonning layer by compounding a dye therein. Also, the sticky material layer (E) may be compounded of a rust preventive. In addition, it is possible to impart a function as the protective layer to the sticky material layer by dispersing the inorganic fine particles (C2) in this sticky material layer.

As more specific content of the sticky material layer (E), those described in each publication of JP-A Nos. 10-217380 and 2002-323861 may be adopted.

(Production of a Laminate)

The laminate of the present invention comprises the transparent substrate (A) and the transparent conductive thin-film layer (B) containing silver and the protective layer (C) containing the binder material (C1) and the inorganic fine particles (C2) and having a thickness of, preferably, 2 μm or less, wherein the transparent conductive thin-film layer (B) is in contact with the protective layer (C). The position of the transparent substrate (A) is optional as long as the transparent conductive thin-film layer (B) is in contact with the protective layer (C). The transparent conductive thin-film layer (B) may be formed directly on the transparent substrate (A) or the transparent substrate (A) may be applied to the transparent conductive thin-film layer (B) through the sticky material layer (E). Also, the transparent substrate (A) may be applied to the protective layer (C) through the sticky material layer (E).

The sectional view showing one example of the layer structure of the laminate according to the present invention is the aforementioned FIG. 1. To state in more detail, FIG. 1 shows a laminate comprising a transparent conductive thin-film layer in which a transparent conductive metal thin-film layer 15 containing silver and a transparent high-refractive index thin-film layer 17 are alternately formed repeatedly on a transparent polymer film substrate 13 and a protective layer formed thereon.

(Fabrication of an Optical Filter)

The optical filter of the present invention comprises:
a transparent substrate (A);
a conductive thin-film layer (B) containing silver;
a protective layer (C);
a functional transparent layer (D); and, as required;
a sticky material layer (E).

The sticky material layer (E) may be used not only in the method of producing the laminate but also in the case of applying other layers when functional transparent films such as an anti-reflecting film and glare-proof film are used as the functional transparent layer (D).

Each structure of the transparent conductive thin-film layer (B) and the protective layer (C) in the display filter of the present invention is optional insofar as these layers are in contact with each other. However, in the case where an anti-reflecting layer and a glare-proof layer are used as the functional transparent layer (D), these layers are preferably formed on the outermost layer.

Specific examples of the structure of the display filter of the present invention include:

(1) a structure in which a double-layer transparent substrate prepared by applying a polymer film to a glass substrate is used as the transparent substrate (A), a transparent conductive thin-film layer is formed on the polymer film as the transparent conductive thin-film layer (B), a layer constituted of the binder material (C1) and the inorganic fine particles (C2) is formed as the protective layer (C) which is in contact with the conductive thin-film layer (B) and a film having an anti-reflecting function or a glare-proof function or a film obtained by applying the films having an anti-reflecting function and a glare-proof function respectively to each other by using the sticky agent layer (E) is used as the functional transparent layer (D); and (2) a structure in which a glass plate is used as the transparent substrate (A), a transparent conductive thin-film layer is formed on the glass plate as the transparent conductive thin-film layer (B), a layer constituted of the binder material (C1) and the inorganic fine particles (C2) is formed as the protective layer (C) which is in contact with the transparent conductive thin-film layer (B) and a film having an anti-reflecting function or a glare-proof function or a film obtained by applying the films having an anti-reflecting function and a glare-proof function respectively to each other by using the sticky agent layer (E) is used as the functional transparent layer (D).

Figure 2:
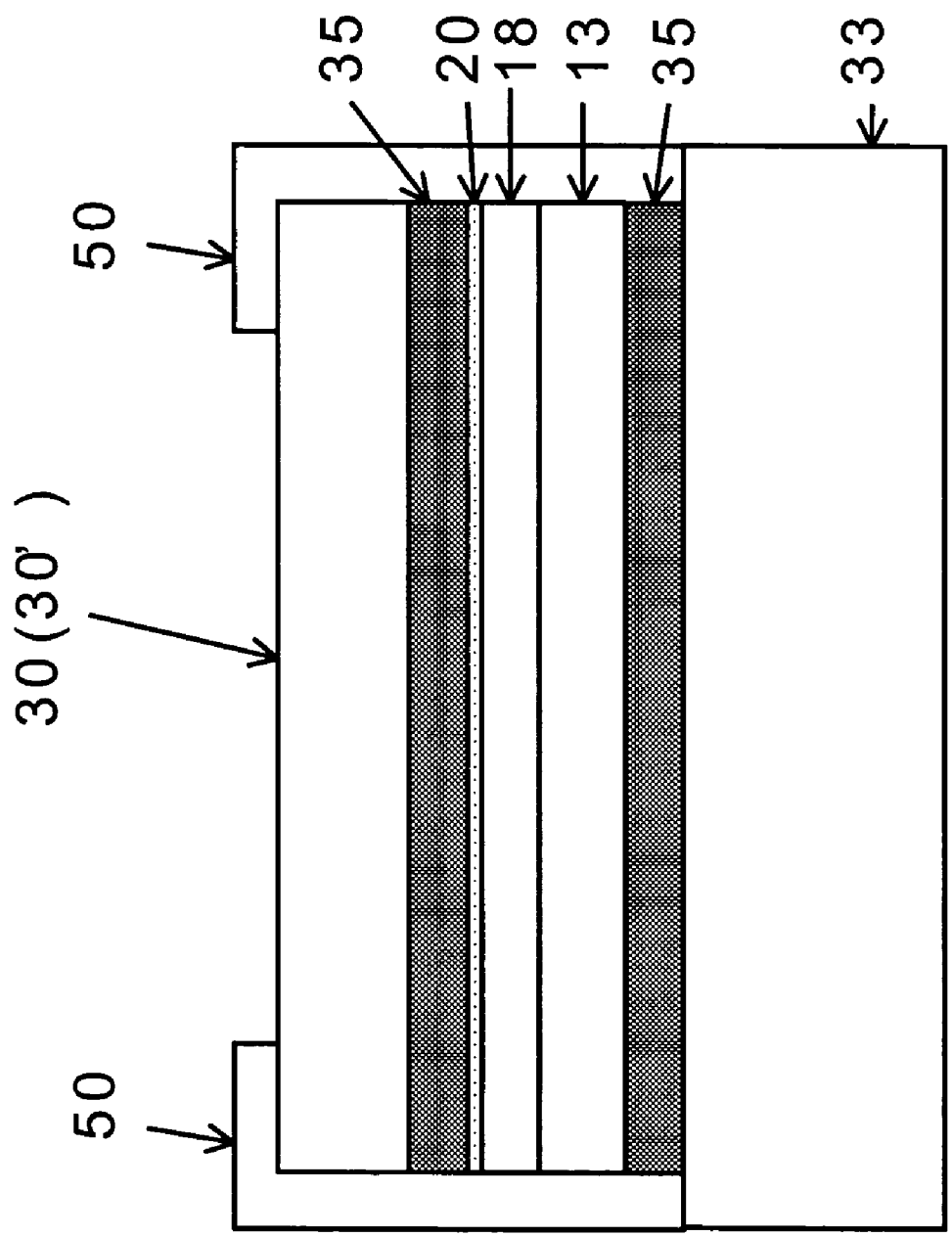
FIG. 2 is a sectional view showing one example of the layer structure of an electromagnetic wave-shielding display optical filter.

FIG. 2 is a sectional view showing one example of the layer structure of the display filter according to the present invention. Specifically, an electromagnetic wave-shielding display optical filter in which a transparent conductive thin-film laminate film constituted of a transparent polymer film substrate 13, a multilayer transparent conductive thin-film layer 18 and a protective layer 20, a film 30 having an anti-reflecting function (hereinafter referred to as an anti-reflecting film if necessary) or a film 30' having a glare-proof function (hereinafter referred to as a glare-proof film if necessary) and a transparent support substrate 33 are laminated on each other by application using a sticky agent 35, and an electrode 50 is formed in contact with the multilayer transparent conductive thin-film layer 18 is shown in FIG. 2. In this case, the transparent support substrate 33 and the transparent polymer film substrate 13 which are applied to each other by using the sticky material layer 35 corresponds to the transparent substrate (A).

As the electrode, a known one which is preferably used in filters having an electromagnetic wave-shielding function may be adopted without any limitation. The electrode is preferably formed on the frame of the outside peripheral part to take out current efficiently from a wide area. As a method of forming the electrode, known means such as application or printing of a conductive paint and application of a conductive tape are used. To state in more detail, those described in each publication of JP-A Nos. 10-217380 and 2002-323861 may be adopted.

As to other examples, an electromagnetic wave-shielding display optical filter having a film form and provided with no transparent support substrate 33 in FIG. 2 is also given as a preferable example. In this case, the transparent polymer film substrate 13 is the transparent substrate (A). Also, the above optical filter may be applied directly to a PDP module through the sticky agent 35 upon use.

As further examples, those using a transparent sheet having an impact resistance as the transparent substrate (A) in place of the transparent support substrate 33 are given. Such an optical filter is preferably applied directly to a PDP module through a sticky agent 35 upon use. When a display filter is applied directly to a PDP module, there is the possibility of the PDP broken by external impact. However, the aforementioned optical filter has a resistance to impact and is therefore superior in the ability to protect the expensive PDP module from the external impact.

The members that form the above each layer may have plural functions. For example, the foregoing anti-reflecting film formed with the transparent conductive thin-film layer has three types of function as the transparent substrate (A), the transparent conductive thin-film layer (B) and the functional transparent layer (D). It is expected that the use of such a member will allow the laminate and display filter of the present invention to be thinner and the productivity to be improved because of a reduction in the number of steps in the production.

(Electromagnetic Wave-Shielding Film, Heat-Ray Reflecting Film and Window)

The electromagnetic wave-shielding film and heat-ray reflecting film of the present invention are preferably used for devices whose functions are affected by electromagnetic waves and for devices limited in use at high temperatures, for example, semiconductor devices such as various precision devices having semiconductor circuits and the like and windows of buildings such as offices. More specific examples of the semiconductor devices may include devices of which visibility is demanded such as pinball machines and game machines.

The electromagnetic wave-shielding film capable of being applied to a window comprises a transparent substrate (A), a transparent conductive thin-film layer (B), a protective layer (C) containing a binder material (C1) and inorganic fine particles (C2) and a functional transparent layer (D). The electromagnetic wave-shielding film capable of being applied to a window is characterized in that a hardcoat layer, a ultraviolet absorbing layer and, as required, a sticky agent layer are preferably contained as the functional transparent layer (D). The electromagnetic wave-shielding film capable of being applied to a window is characterized in that as a specific layer structure, it has a structure in which the transparent substrate (A), the transparent conductive thin-film layer (B), the protective layer (C) and the hardcoat layer are arranged in the following order: hardcoat layer/transparent substrate (A)/transparent conductive thin-film layer (B)/protective layer (C) or transparent substrate (A)/transparent conductive thin-film layer (B)/protective layer (C)/hardcoat layer. In the above structure, each position of the ultraviolet absorbing layer and the sticky material layer (E) used according to the need is optional.

Figure 3:
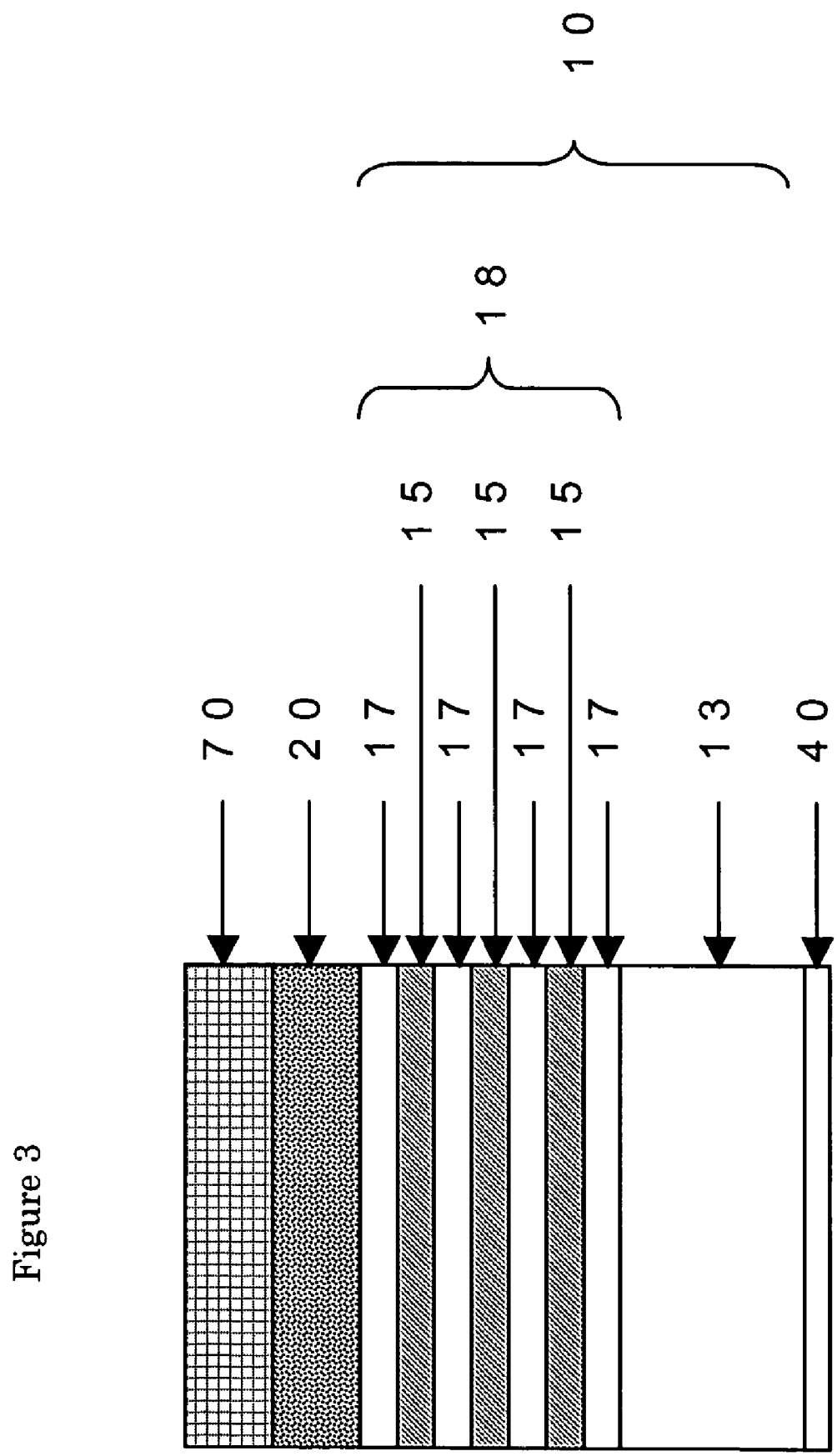
FIG. 3 is a view showing one example of the layer structure of an electromagnetic wave-shielding film capable of being applied to a window in the present invention.

FIG. 3 shows one example of the structure of the electromagnetic wave-shielding film capable of being applied to a window according to the present invention.

The electromagnetic wave-shielding film capable of being applied to a window shown in FIG. 3 is manufactured by the following method. A multilayer transparent conductive thin-film layer 18 obtained by laminating four transparent high-refractive index thin-film layers 17 and three transparent conductive thin-film layers 15 containing silver alternately on one side of a transparent polymer film substrate 13 by a sputtering method is formed to obtain a laminate 10. Next, a hardcoat layer 40 is formed on the transparent polymer film substrate 13 side of the laminate 10. A protective layer 20 constituted of a binder resin and inorganic fine particles is formed on the multilayer transparent conductive thin-film layer 18. Further, a sticky material layer 70 containing a ultraviolet absorber is formed on the protective layer 20 to obtain the electromagnetic wave-shielding film capable of being applied to a window according to the present invention.

The electromagnetic wave-shielding film capable of being applied to a window according to the present invention is superior in electromagnetic wave-shielding ability since it is provided with the transparent conductive thin-film layer as mentioned above. The electromagnetic wave-shielding film capable of being applied to a window according to the present invention preferably has the characteristics that the electromagnetic wave-shielding ability determined by an Adovantest method is preferably 30 dB or more in a frequency range from 30 MHz to 6000 MHz. The electromagnetic wave-shielding ability is more preferably 35 dB or more and still more preferably 40 dB or more. Also, the emissivity is preferably 0.25 or less and more preferably 0.20 or less.

Also, the electromagnetic wave-shielding film capable of being applied to a window according to the present invention may be provided with heat-ray reflecting ability by appropriately selecting and controlling the structure of the transparent conductive thin-film layer. This heat-ray reflecting ability may be evaluated by, for example, solar radiation reflectance ((JIS) A 5759). The solar radiation reflectance of the electromagnetic wave-shielding film capable of being applied to a window according to the present invention is preferably 25% or more and more preferably 30% or more.

Various display devices using the display filter of the present invention, for example, a plasma display, liquid crystal display and organic EL display device uses the above display filter. Therefore, these display devices are reduced in the leakage of electromagnetic waves, are free from the malfunction of a remote control and can provide a beautiful image.

(Window)

Figure 4:
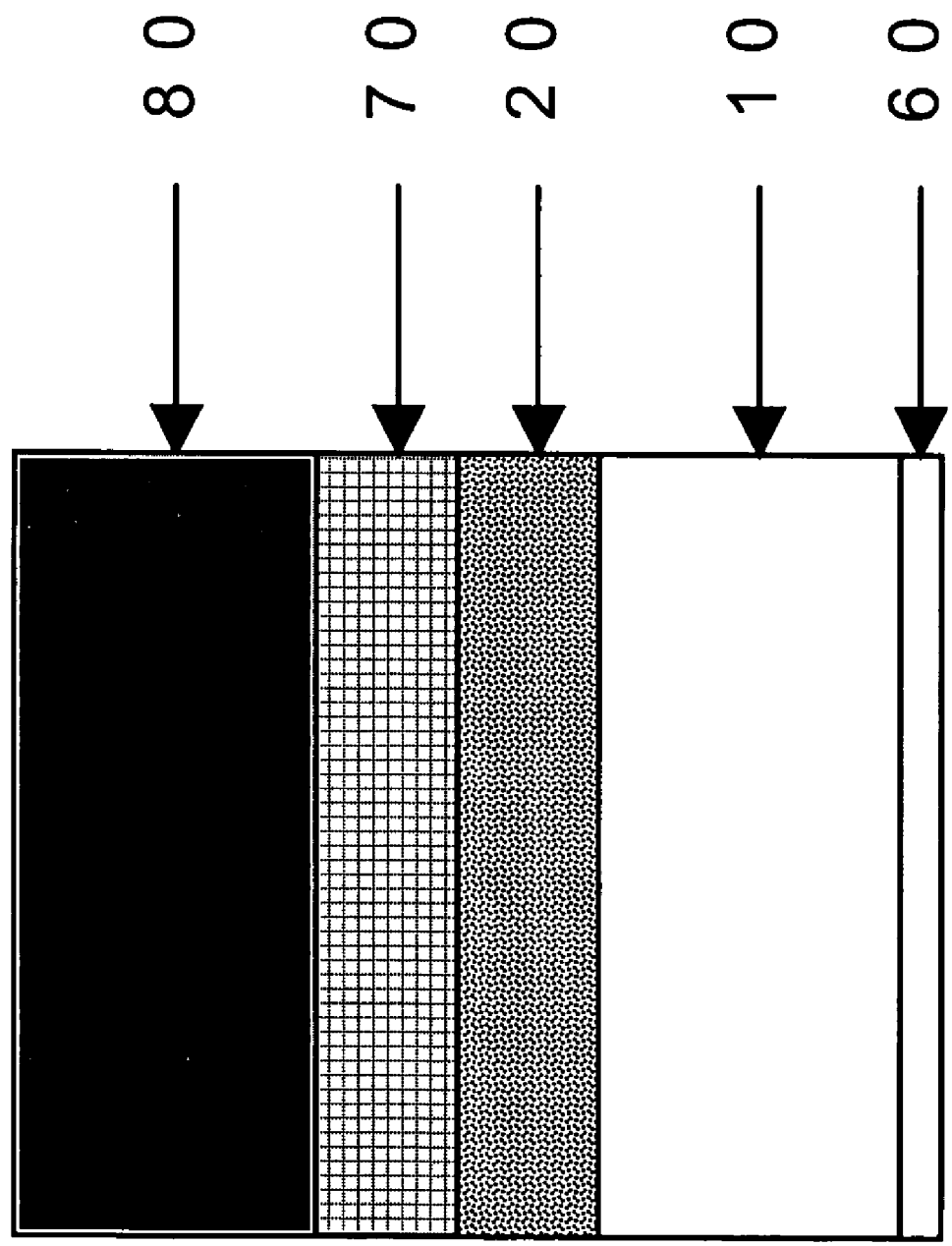
FIG. 4 is a sectional view showing one example of the layer structure of a window according to the present invention.

The window of the present invention has a structure in which the aforementioned electromagnetic wave-shielding film capable of being applied to the window is laminated on a substrate for transparent window use. As the substrate for transparent window use, known substrates for window use such as a glass plate and acryl plate may be used without any limitation. FIG. 4 is a sectional view showing one example of the layer structure of the window according to the present invention. Specifically, the window has a structure in which a hardcoat layer 60 is disposed on a laminate 10 similar to that shown in FIG. 3, a protective layer 20 constituted of a binder resin and inorganic fine particles and a sticky material layer 70 containing a ultraviolet absorber are formed on the side opposite to the hardcoat layer 60 and a glass substrate 80 for window use is further applied.

A general method of carrying out the application of the electromagnetic wave-shielding film capable of being applied to the window according to the present invention to the substrate for transparent window use is shown hereinbelow. As the electromagnetic wave-shielding film for window use, one having a sticky material layer on its surface is preferably used. First, the substrate for transparent window use and the sticky material layer side surface of the electromagnetic wave-shielding film for window use are wetted with a mixed solution of water and a surfactant. Then, the substrate for transparent window use is applied temporarily to the electromagnetic wave-shielding film for window use. Finally, water is scraped out using a squeegee to apply the window to the film firmly.

The concentration of chlorine at the terminal of city water is defined as 0.1 ppm (1 mg in 1l) or more by Water-Supply Law in Japan. As outlined above, chlorine is present in water and fine dust and foreign substances are intermingled between the substrate for transparent window use and the film. Therefore, when the transparent conductive thin-film layer is in contact with chlorine that penetrates into the layer from the outside, there is the case where reflection defects are caused.

However, the electromagnetic wave-shielding film for window use according to the present invention has a structure in which the transparent conductive thin-film layer (B) is in contact with the protective layer (C) and therefore the occurrence of reactive defects is outstandingly small. This fact can be confirmed by an acceleration evaluation method in which a product prepared by applying the electromagnetic wave-shielding film of the present invention or the laminate of the present invention is applied to glass by the above method utilizing city water is set to a high-temperature and high humidity processing device operated at 60° C. under 90% RH and, after 24 hours, the frequency of the occurrence of reflection defects 0.1 mm or more in diameter caused by the aggregation of silver is observed/measured by a microphotograph. It is surprising to find that the number of the reactive defects generated by the above evaluation method when the laminate of the present invention or one prepared by applying the laminate to glass is evaluated can be decreased to 10 defects/10 cm$^2$ or less, preferably 8 defects/10 cm$^2$ or less and more preferably 6 defects/10 cm$^2$ or less.

Also, the ultraviolet absorbing layer is preferably used in the case where the transparent substrate (A) has poor durability to ultraviolet rays. In this case, the ultraviolet absorbing layer is preferably located at a part nearest to the substrate for transparent window use which substrate is glass as a typical example to which the electromagnetic wave-shielding film is applied. Although the transparent conductive thin-film layer (B) has the ability to reflect or absorb ultraviolet rays, there is the case where it is not enough to protect the transparent substrate (A) from ultraviolet rays. On the other hand, the window of the present invention is arranged such that the substrate for transparent window use is disposed outside the room and the electromagnetic wave-shielding film capable of being applied to the window is disposed inside the room. For this, it is desirable to dispose the ultraviolet absorbing layer (E) between the transparent substrate (A) and the window glass to be applied.

Since the laminate and display filter of the present invention respectively have the structure in which the transparent conductive thin-film layer (B) is in contact with the protective layer (C), the generation of the above reactive defects is outstandingly decreased. This fact can be confirmed by an acceleration evaluation method in which the laminate or display filter of the present invention is set to a high-temperature and high humidity processing device operated at 60° C. under 90% RH and, after 24 hours, the frequency of the occurrence of spot defects (reflection defects) 0.1 mm or more in diameter caused by the aggregation of silver is observed/measured by a microphotograph. It is surprising to find that the number of the reactive defects generated by the above evaluation method when the laminate of the present invention or display filter is evaluated can be decreased to 2 defects/m$^2$ or less, preferably 1 defect/m$^2$ or less and more preferably 0.5 defects/m$^2$ or less.

The reason why the generation of the above reactive defects is outstandingly suppressed is not clarified. However, this is considered to be because the protective layer (C) and particularly the inorganic fine particles (C2) have the effect of trapping components, for example, chlorides, which aggregate silver stuck to the transparent conductive thin-film layer and the effect of suppressing reactivity to silver. Also, it is inferred to be one of the reasons that the protective layer (C) prevents components which will react with silver from intruding from the outside so that these components cannot reach the metal thin film. For this, the inorganic fine particles (C2) are preferably distributed closely in the protective layer (C) according to the present invention. Also, the inorganic fine particles (C2) are preferably distributed thinly and uniformly. If the above uniformity is too low, there is the case where the transparency of the laminate is uneven. Also, if the inorganic fine particles (C2) are distributed in an excessively thick state, there is the case where visible ray transmittance is dropped.

The term "transparent" in the laminate of the present invention and in the above applications using the laminate means that the visible ray transmittance determined by Japanese Industrial Standard (JIS) R3106 is preferably 10 to 98%, more preferably 20 to 95%, and still more preferably 20 to 90%.

(Method Analysis)

Measures for analyzing the laminate of the present invention are as follows.

The atomic composition of the surface of the laminate may be measured using, for example, an Auger electron spectroscopic method (AES), fluorescent X-ray method (XRF), X-ray microanalysis method (XMA), charge particle exciting X-ray analysis method (RBS), X-ray photoelectron spectroscopic method (XPS), vacuum ultraviolet light electron spectroscopic method (UPS), infrared absorption spectroscopic method (IR), Raman spectroscopic method, secondary ion mass analysis method (SIMS) or low energy ion scattering spectroscopic method (ISS). Also, the atomic composition and each film thickness in the laminate can be found by carrying out an X-ray photoelectron spectroscopic method (XPS), Auger electron spectroscopic method (AES) or secondary ion mass analysis method (SIMS) to measure the laminate in the direction of the depth.

The structure of the laminate and the condition of each layer can be found by measuring the section of the laminate by an optical microscope, scanning type electron microscope (SEM) or transmission type electron microscope (TEM).

The laminate and display filter of the present invention are substantially decreased in the occurrence of reactive defects. This entails higher yield as compared with that of conventional laminates or display filters, and specifically enable the provision of display filters such as PDPs at high yield. Also, because high productivity is obtained, the above display filter can be provided at low costs. Also, it is inferred that the generation of reactive defects with time is small and it is therefore possible to provide a high quality image for a very long period of time.

An electromagnetic wave-shielding film and a heat-ray reflecting film using the laminate of the present invention are substantially decreased in the generation of reactive defects even if they are in contact with city water or the like. Therefore, the present invention can provide a window having high visibility in addition to electromagnetic wave-shielding ability and heat-ray reflecting ability even if the window having electromagnetic wave-shielding ability or heat-ray reflecting ability is produced using a conventional application method using general city water.

From these reasons, the present invention is industrially highly significant.

EXAMPLES

The present invention will be explained in more detail by way of examples. In these examples, all designations of % and parts indicate weight percentage (wt. %) and parts by weight, respectively, unless otherwise noted.

Example 1

(1) (Formation of a Transparent Conductive Thin-Film Laminate Film)

A transparent conductive thin-film laminate film having the same structure as that shown in FIG. 1 was produced. Specifically, a polyethylene terephthalate film (thickness: 75 µm) was used as a transparent substrate, and an ITO thin-film layer (transparent high-refractive index thin-film layer) made of indium and tin and a silver thin-film layer (transparent metal thin-film layer) were laminated one by one on one principal surface of the polyethylene terephthalate film by a d.c. magnetron sputtering method to obtain a transparent conductive thin-film laminate film. The structure of the transparent conductive thin-film laminate film was as follows: transparent film substrate (75 µm)/ITO (40 nm)/Ag (15 nm)/ITO (80 nm)/Ag (20 nm)/ITO (80 nm)/Ag (15 nm)/ITO (80 nm).

Here, in the formation of the ITO thin-film layer, an indium oxide/tin oxide sintered body ($In_2O_3$: $SnO_2$=90:10 (mass ratio)) was used as a target and argon/oxygen mixed gas (total pressure: 266 mPa and partial pressure of oxygen: 5 mPa) was used as sputtering gas. Also, in the formation of the silver thin-film layer, silver was used as a target and argon gas (total pressure: 266 mPa) was used as sputtering gas.

Also, the thickness of each layer was controlled by controlling the time required to form a film. This is a method made possible for the first time when film-forming rate is found in advance in the same condition as the film-forming condition of each layer.

(2) (Formation of a Protective Layer)

A suspension solution containing 3% of a silicone resin and 3% of zinc oxide/antimony oxide fine particles was obtained by compounding a silicone resin (glass resin manufactured by SHOWA DENKO K.K.) as a binder material, zinc oxide/antimony oxide fine particles (CELNAX, manufactured by Nissan Chemical Industries, Ltd.) as inorganic fine particles and isopropyl alcohol (for a reagent) as a solvent (hereinafter, a suspension solution obtained in this manner is used as a coating solution).

The obtained coating solution was applied to the transparent high-refractive index thin-film layer which was the outermost layer of the transparent conductive thin-film laminate film by using a micro-gravure coating method and dried at 120° C. for one minute to form a protective layer 0.2 µm in film thickness, thereby obtaining a laminate.

(3) (Fabrication of a Display Filter)

A display filter having the same structure that is shown in FIG. 2 was produced. First, a 100 µm-thick film (made of PET) having anti-reflecting ability was applied to the protective layer 20 side of the above laminate by using a sticky material (containing 0.2% of benzotriazole). Also, a 2-mm-thick PMMA substrate used as a transparent support substrate is applied to the transparent polymer film substrate side of the laminate by using a sticky agent. Further, an electrode having a thickness of 15 µm was formed by screen-printing of a silver paste, followed by drying, thereby making a display filter.

(4) (Acceleration Corrosion Resistance Test)

The display filter obtained in the above manner was set to a high-temperature and high humidity processing device operated at 60° C. under 90% RH and, after 24 hours, the frequency of the occurrence of spot defects (reflection defects) 0.1 mm or more in diameter caused by the aggregation of silver is observed/measured visually and by a microphotograph.

The results are shown in Table 1.

Example 2

A display optical filter was produced in the same manner as in Example 1 except that the thickness of the protective layer after it was applied and dried was 1 µm. The filter was subjected to the acceleration corrosion resistance test made in the same manner as in Example 1. The results are shown in Table 1.

Example 3

A display optical filter was produced in the same manner as in Example 1 except that as the coating solution, a coating solution (SUMICEFINE manufactured by Sumitomo Osaka Cement) containing a polyester resin as the binder material and tin oxide/antimony oxide as the inorganic fine particles was used and the thickness of the protective layer was changed to 0.1 µm. The filter was subjected to the acceleration corrosion resistance test made in the same manner as in Example 1. The results are shown in Table 1.

Example 4

A display optical filter was produced in the same manner as in Example 1 except that as the coating solution, a coating solution containing a polyester resin (Eryther, manufactured by Unitika Ltd.) as the binder material and toluene (for a regent) as the solvent was used and the thickness of the protective layer was changed to 0.1 µm. The filter was subjected to the acceleration corrosion resistance test made in the same manner as in Example 1. The results are shown in Table 1.

Example 5

A display optical filter was produced in the same manner as in Example 1 except that a coating solution was used in which a urethane resin (Olestar, manufactured by Mitsui Chemicals, Inc.) was used as the binder material and toluene (for a reagent) was used as the solvent and the thickness of the protective layer was changed to 0.1 μm. The filter was subjected to the acceleration corrosion resistance test made in the same manner as in Example 1. The results are shown in Table 1.

Comparative Example 1

A display filter was fabricated in the same manner as in Example 1 except that the step of forming the protective layer was not carried out. The filter was subjected to the acceleration corrosion resistance test made in the same manner as in Example 1. The results are shown in Table 1.

Comparative Example 2

A display optical filter was fabricated in the same manner as in Example 1 except that the amount of the silicone resin was altered to 3% and the amount of the zinc oxide-antimony fine particles was altered to 0% in the coating solution. The filter was subjected to the acceleration corrosion resistance test made in the same manner as in Example 1. The results are shown in Table 1.

It is clearly found from Table 1 that the protective layer constituted of a binder material and inorganic fine particles is formed at the part in contact with the multilayer conductive metal laminate thin film of the laminate film, whereby the frequency of the generation of spot defects caused by the aggregation of silver is decreased more greatly than in the case of forming no protective layer or in the case of forming a binder material singly.

transparent electromagnetic wave-shielding film was as follows: PET film (75 μm)/ITO (40 nm)/Ag (10 nm)/ITO (80 nm)/Ag (10 nm)/ITO (80 nm)/Ag (10 nm)/ITO (80 nm).

The performance of the transparent electromagnetic wave-shielding film with the above structure was as follows: surface resistance: 2Ω/□, electromagnetic wave-shielding ability (measuring method: Advantest method): 42 dB, emittivity (JIS A 5759): 0.10 and solar radiation reflectance (JIS A 5759): 32%. (Note: the unit of 32% described on the left is the unit of the solar radiation reflectance.

Here, in the formation of the ITO thin-film layer, an indium oxide-tin oxide sintered body ($In_2O_3$: $SnO_2$=90:10 (mass ratio)) was used as a target and argon/oxygen mixed gas (total pressure: 266 mPa and partial pressure of oxygen: 5 mPa) was used as sputtering gas.

(2) (Formation of a Protective Layer)

A protective layer was formed in the same manner as in Example 1.

(3) (Formation of a Sticky Agent Layer and a Hardcoat Layer)

An acryl type sticky agent (manufactured by TOYO INK MFG. CO., LTD.) containing a ultraviolet absorber was applied as a sticky agent to the above protective layer and dried at 80° C. for 2 minutes to form a sticky agent layer having a film thickness of 25 μm.

Also, an acryl type hardcoat agent (manufactured by JSR Corporation) was applied as a hardcoat agent to the side opposite to the surface to which the above sticky agent was applied, dried at 80° C. for 2 minutes and cured by irradiating the sticky agent with ultraviolet rays, to form a hardcoat layer having a film thickness of 3 μm.

(4) (Formation of a Window Sample)

First, 1 ml of a surfactant was mixed in 500 ml of Japanese city water to prepare water for water application. A trial glass substrate (A4 size) and the above transparent electromagnetic wave-shielding film with the protective layer and the sticky

TABLE 1

|  | Protective layer | | | Density of the number of reflective defects to be generated (defects/m²) |
| --- | --- | --- | --- | --- |
|  | Inorganic fine particles | Binder material | Thickness (μm) |  |
| Example 1 | Zinc oxide/antimony oxide | Silicone resin | 0.2 | 0.2 |
| Example 2 | Zinc oxide/antimony oxide | Silicone resin | 1 | 0.1 |
| Example 3 | Tin oxide/antimony oxide | Polyester resin | 0.1 | 0.1 |
| Example 4 | Zinc oxide/antimony oxide | Polyester resin | 0.1 | 0.4 |
| Example 5 | Zinc oxide/antimony oxide | Urethane resin | 0.1 | 0.6 |
| Comparative Example 1 | Not used | Not used | — | 9.5 |
| Comparative Example 2 | Not used | Silicone resin | 0.2 | 6.6 |

Example 6

(1) Formation of a Transparent Electromagnetic Wave-Shielding Film)

A polyethylene terephthalate (PET) film (thickness: 75 μm) was used as a transparent polymer film substrate, and an ITO thin-film layer made of an oxide of indium and tin as a transparent high-refractive index thin-film layer and a silver thin-film layer as a transparent conductive metal thin-film layer containing silver were laminated one by one on one principal surface of the polyethylene terephthalate film by a d.c. magnetron sputtering method to obtain a transparent electromagnetic wave-shielding film. The structure of the material layer were wetted with the above produced water and then applied to each other to form a product as a transparent electromagnetic wave-shielding window sample.

(5) (Acceleration Corrosion Resistance Test)

The transparent electromagnetic wave-shielding sample obtained in the above manner was set to a high-temperature and high humidity processing device operated at 60° C. under 90% RH and, after 24 hours, the density of the occurrence of reflective defects 0.1 mm or more in diameter caused by the aggregation of silver is observed/measured by a microphotograph. This value was an average of 10 samples measured.

The results are shown in Table 2.

TABLE 2

| | Protective layer | | Thickness μm | Density of the number of reflective defects to be generated (defects/10 cm²) |
|---|---|---|---|---|
| | Inorganic fine particles | Binder material | | |
| Example 6 | Zinc oxide/antimony oxide | Silicone resin | 0.2 | 5 |
| Example 7 | Zinc oxide/antimony oxide | Silicone resin | 1 | 1 |
| Example 8 | Tin oxide/antimony oxide | Polyester resin | 0.2 | 4 |
| Comparative Example 3 | Not used | Not used | — | 20 |
| Comparative Example 4 | Not used | Silicone resin | 0.2 | 15 |

Example 7

A transparent electromagnetic wave-shielding film was produced in the same manner as in Example 6 except that the thickness of protective layer obtained after the application and drying was changed to 1 μm and was then subjected to the acceleration corrosion resistance test made in the same manner as in Example 6. The results are shown in Table 2.

Example 8

A transparent electromagnetic wave-shielding film was produced in the same manner as in Example 6 except that a coating solution using a polyester resin (trade name: SUM-ICEFINE, manufactured by Sumitomo Osaka Cement Co., Ltd.) as the binder material and tin oxide/antimony oxide as inorganic fine particles was used as the coating solution used in Example 6 and the thickness of the protective layer was 0.1 μm and was then subjected to the acceleration corrosion resistance test made in the same manner as in Example 6. The results are shown in Table 2.

Comparative Example 3

A transparent electromagnetic wave-shielding film was produced in the same manner as in Example 6 except that the step of forming the protective layer was not performed and was then subjected to the acceleration corrosion resistance test made in the same manner as in Example 6. The results are shown in Table 2.

Comparative Example 4

A display filter was fabricated in the same manner as in Example 6 except that the amount of the silicone resin in the coating solution was changed to 3% and the zinc oxide-antimony fine particles were not used and was then subjected to the acceleration corrosion resistance test made in the same manner as in Example 6. The results are shown in Table 2.

It is clearly found from Table 2 that the protective layer containing inorganic fine particles is formed at the part in contact with the multilayer conductive metal laminate thin film of the laminate film, whereby a window is obtained which is very decreased in the frequency of the generation of spot defects caused by the aggregation of silver.

What is claimed is:

1. A laminate comprising:
    a transparent substrate (A);
    a transparent conductive film layer (B) comprising a transparent metal film layer (B2) containing silver or an alloy containing silver; and a transparent film layer having a refractive index of 1.4 or more for light having a wavelength of 550 nm (B1); and
    a protective layer (C) containing a binder material (C1) and inorganic fine particles having an average diameter of 5 to 500 nm (C2), wherein the transparent film layer (B1) is in contact with the protective layer (C).

2. A laminate according to claim 1, wherein the inorganic fine particles (C2) comprise metal oxides.

3. A laminate according to claim 1, wherein the inorganic fine particles (C2) comprise complex oxides containing antimony oxide or a mixture of oxides containing antimony oxide.

4. A laminate according to claim 1, wherein the binder material (C1) comprises one or more resins selected from a silicone resin, a polyester resin and a urethane resin.

5. A display filter comprising:
    the laminate as claimed in claim 1; and
    a functional transparent layer (D).

6. A display filter according to claim 5, wherein the frequency of the occurrence of spot defects 0.1 mm or more in diameter is 2 defects/m² or less after the filter is exposed to an atmosphere of 60° C. and 90% RH for 24 hours.

7. A display device comprising the display filter as claimed in claim 5.

8. An electromagnetic wave-shielding film comprising the laminate as claimed in claim 1.

9. A heat-ray reflecting film comprising the laminate as claimed in claim 1.

10. An electromagnetic wave-shielding film capable of being applied to a window, wherein the film comprises:
    the laminate as claimed in claim 1; and
    a functional transparent layer (D).

11. A heat-ray reflecting film capable of being applied to a window, wherein the film comprises:
    the laminate as claimed in claim 1; and
    a functional transparent layer (D).

12. A window having a laminate structure comprising the electromagnetic wave-shielding film capable of being applied to a window as claimed in claim 10 and a substrate.

13. A window having a laminate structure comprising the heat-ray reflecting film capable of being applied to a window as claimed in claim 11 and a substrate.

14. A semiconductor device comprising the laminate as claimed in claim 1.

* * * * *